3,161,675
PROCESS FOR PREPARING SULFONAMIDE COMPOUNDS

Erwin F. Schoenewaldt, Metuchen, Arthur E. Erickson, Cranford, and John M. Chemerda, Metuchen, N.J., assignors to Merck & Co., Inc., Rahway, N.J., a corporation of New Jersey
No Drawing. Filed June 17, 1957, Ser. No. 666,212
2 Claims. (Cl. 260—543)

This invention is concerned with a novel process for the preparation of disulfamylaniline compounds having the general structural formula

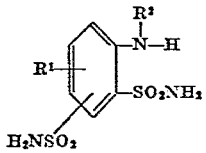

wherein $R^1$ is halogen, such as chlorine, bromine or fluorine, lower alkyl advantageously having from one to five carbon atoms, lower alkoxy also advantageously containing from one to five carbon atoms in the alkyl portion of the radical, and nitro or amino groups; and $R^2$ is hydrogen or a lower alkyl radical having advantageously from one to five carbon atoms.

The above compounds which are prepared by the novel method of this invention are useful chemotherapeutic agents principally because of their diuretic and/or natriuretic properties. The compounds are effective upon oral administration in the form of tablets or capsules and the like as well as by injection when dissolved in a dilute alkaline medium or in polyethylene glycol solutions. The compounds also are useful as intermediates in preparing benzothiadiazine-1,1-dioxide compounds which also possess diuretic and/or natriuretic properties and which can be administered in the same dosage forms as the disulfamylaniline compounds prepared by the method described herein.

The novel method for preparing the above disulfamylaniline compounds comprises two steps, the chlorosulfonation of the selected aniline compounds to form the disulfonyl chloride derivative and ammonolysis to convert the thus obtained disulfonyl chloride compound to the corresponding disulfamyl derivative.

Sulfonylchlorides in the past were generally made by reacting a selected compound with chlorosulfonic acid or by chlorinating a sulfonic acid salt of the selected compound. These methods work very poorly or not at all on aromatic amines. Lustig and Katscher, Monatshefte, vol. 38, page 87 (1927), comment about this and report that chlorosulfonation of an aromatic amine can be effected by using an alkali chlorosulfonate. The alkali chlorosulfonate can be prepared in situ in the reaction mixture if desired by adding sodium chloride to chlorosulfonic acid. While the chlorosulfonation reaction can be carried out by fusing these ingredients, this method is impractical for commercial production of the compounds desired. Thus, when this reaction is employed on a large scale, it is necessary to employ a diluent. While the yield of the disulfonyl chloride derivative is fair when a diluent is used, the reaction is not always reproducible and is very difficult to handle mechanically as a slurry is generally formed. Additionally, the diluent introduces impurities and is difficult to remove completely from the reaction product.

We have found as one feature of this invention that when a chlorinating agent, preferably thionyl chloride ($SOCl_2$) but also sulfuryl chloride ($SO_2Cl_2$), phosphorus trichloride ($PCl_3$) or phosphorus pentachloride ($PCl_5$) is added to the aniline and chlorosulfonic acid reaction mixture, the reaction carries through to the disulfonyl chloride derivative reproducibly in excellent yields ranging around about 90% without requiring any other diluent or solvent. As the preferred temperature range of 125–130° C. for the reaction between the selected aniline compound and chlorosulfonic acid is above the boiling point of all of the chlorinating agents with the exception of phosphorus pentachloride when in solution with these reactants, the initial reaction at 125–130° C. is first carried out, the reaction mixture cooled, the chlorinating agent then is added and heating below the boiling point continued until completion of the reaction. As the boiling point of phosphorus pentachloride is above the preferred temperature range of the reaction between the aniline compound and chlorosulfonic acid, this chlorinating agent can be added to the reaction mixture from the beginning if desired. When chlorosulfonation has been accomplished, the mixture can be quenched with water either direct or reverse, advantageously with ice-cooling, and the product recovered by simple filtration.

The same reaction conditions can be applied to the salts or to the lower alkanoyl derivatives of the selected aniline starting material yielding the same product as the N-unsubstituted or the N-alkyl aniline starting material because the acyl and the salt groups are cleaved off during the chlorosulfonation reaction.

The compounds employed in the chlorosulfonation reaction step of the process of this invention should be employed in the ratio of at least 5 molar equivalents of chlorosulfonic acid and at least 2 molar equivalents of the chlorinating agent for each mole of aniline starting material. While these proportions will produce the disulfonyl chloride provided the heating is continued for a sufficient length of time, in practice it is preferred to employ an excess of chlorosulfonic acid and/or chlorinating agent particularly for their solvent properties. It is especially advantageous to employ an excess of chlorosulfonic acid in order to cause the reaction to proceed more rapidly to completion.

A vigorous reaction between the selected aniline compound and chlorosulfonic acid takes place when the temperature is increased to between 95–100° C. and if the temperature is maintained at this level the disulfonyl chloride compound will be obtained. The reaction is pushed to completion more rapidly, however, when the temperature is raised to between 125–130° C. and this would be the preferred temperature from the commercial production and economical viewpoints.

By employing a chlorinating agent in the chlorosulfonation process of this invention the yield of disulfonyl chloride derivative is greatly improved, the quality of the end product is much better, and the reactor capacity is increased in comparison with the prior art method for chlorinating aromatic amines.

It was also surprisingly found that while ammonolysis of the disulfonyl chloride can be effected by reaction with ammonia in the presence of water or certain organic solvents such as methanol, benzene, isopropanol, and the like, the yields of the disulfamyl derivative were extraordinarily high and a very pure product was obtained when ammonolysis was carried out in the presence of t-butanol. At least 4 equivalents of ammonia is needed to form the disulfamyl derivative although an excess, particularly a 50% excess ensures complete ammonolysis.

The advantages of yield obtained by conducting the ammonolysis in the presence of t-butanol are illustrated in Examples 8 and 9 which demonstrate that a 44% improvement can be gained by conducting the ammonolysis in the presence of t-butanol as compared with ammonolysis in the presence of water.

The novel process of this invention is illustrated by the following examples.

EXAMPLE 1

*Chlorosulfonation: Thionyl Chloride*
*Ammonolysis: t-Butanol* m-Chloroaniline (19.1 g., 0.15 mole) is added with stirring to chlorosulfonic acid (192 g., 1.65 mole) at 10–15° C. The mixture is heated to 125–130° C. for 2½ hours, cooled to 20° C. and then there is added to it during a five-minute period thionyl chloride (72 g., 0.60 mole). The solution is heated at 80° C. for 1½ hours then cooled to 10° C. and treated cautiously with water (15 ml.). The reaction product is added with stirring to 100 g. of iced water and ice is added to the mixture as needed to maintain the quench solution at 0° C. The precipitated granular solid is collected on a filter funnel and washed with three portions of ice water. Air-drying of this product yields 43.6 g. (90% of theory) of 5-chloroaniline-2,4-disulfonyl chloride. This is dissolved in 45 ml. of dry t-butanol and dry ammonia gas is bubbled into the solution for two hours. The reaction mixture is concentrated nearly to dryness in vacuo, diluted with 100 ml. of water, aged at 5° C. for one hour and filtered. The product, washed with water and air-dried, consists of 34.1 g. (79.6% overall) of 5-chloro-2,4-disulfamylaniline, M.P. 258–260° C. The mixed melting point with a reference sample is not depressed.

EXAMPLE 2

*Chlorosulfonation: Phosphorus Pentachloride*
*Ammonolysis: t-Butanol*

This reaction is carried out in substantially the same manner as described in Example 1 except phosphorus pentachloride (52.5 g., 0.30 mole) is substituted for the thionyl chloride used in Example 1. After the addition of phosphorus pentachloride, the reaction mixture is heated at 125–130° C. for one hour, then cooled and quenched directly into ice and water yielding 34.0 g. (70% of theory) of 5-chloroaniline-2,4-disulfonyl chloride as a granular solid precipitate. Ammonolysis in the presence of t-butanol by substantially the same procedure described in Example 1 yields 26.6 g. (62.2% overall) of 5-chloro-2,4-disulfamylaniline, melting point 255–256° C.

EXAMPLE 3

*Chlorosulfonation: Phosphorus Trichloride*
*Ammonolysis: t-Butanol*

This reaction is carried out in substantially the same manner described in Example 1 except the mixture after being heated with chlorosulfonic acid is treated with phosphorus trichloride (52.5 cc., 0.60 mole) instead of thionyl chloride, and heated at 90° C. for 1½ hours. A direct quench into ice water yields 35.5 g. (73% of theory) of 5-chloroaniline-2,4-disulfonyl chloride which assays 95% pure by an argentometric titration of easily hydrolyzable halide. Ammonolysis of the disulfonyl chloride derivative thus obtained in the presence of t-butanol by substantially the same method described in Example 1 yields 28.1 g. (65.6% of theory) of 5-chloro-2,4-disulfamylaniline, melting point 254–256° C.

EXAMPLE 4

*Chlorosulfonation: Sulfuryl Chloride*
*Ammonolysis: t-Butanol*

This reaction is carried out in substantially the same manner described in Example 1 except that in the second phase of the reaction, the mixture is heated at 75–80° C. for 2 hours with sulfuryl chloride (48.5 cc.) instead of with the thionyl chloride employed in Example 1. A reverse quench yields 20.35 g. (41.8% of theory) of 5-chloroaniline-2,4-disulfonyl chloride which assays 97.5% pure by argentometric titration of easily hydrolyzable halide. Ammonolysis of the disulfonyl chloride thus obtained in the presence of t-butanol by substantially the same procedure described in Example 1 yields 16.1 g. (37.6% overall) 5-chloro-2,4-disulfamylaniline. The mixed melting point with a reference sample is not depressed.

EXAMPLE 5

*Chlorosulfonation: Thionyl Chloride*
*Ammonolysis: t-Butanol*

This procedure is carried out in substantially the same manner as described in Example 1 except m-chloroaniline is replaced by a molar equivalent of 3-chloroformanilide. A direct quench of the reaction mixture yields 45.5 g. (93% of theory) of 5-chloroaniline-2,4-disulfonyl chloride identified by melting point, mixed melting point and infra-red spectral comparison with a reference sample. Ammonolysis of the thus obtained disulfonyl chloride by substantially the same method as described in Example 1 yields 27.5 g. (89% of theory) of 5-chloro-2,4-disulfamylaniline, M.P. 256–258° C.

EXAMPLE 6

*Chlorosulfonation: Thionyl Chloride*
*Ammonolysis: t-Butanol*

This reaction is carried out in substantially the same manner as described in Example 1 except m-chloroaniline is replaced by a molar equivalent of 3-chloroacetanilide. A direct quench of the reaction mixture yields 47.2 g. (97% of theory) of 5-chloroaniline-2,4-disulfonyl chloride identified by melting point, mixed melting point and intra-red spectral comparison with a reference sample. Ammonolysis of the thus obtained disulfonyl chloride by substantially the same method described in Example 1 yields 28.8 g. (90% of theory) of 5-chloro-2,4-disulfamylaniline, M.P. 256–258° C.

EXAMPLE 7

*Ammonolysis of Disulfonyl Chloride in t-Butanol*

5-chloroaniline-2,4-disulfonyl chloride (0.50 g.), prepared as described in Example 1, is purified by dissolving in benzene and recrystallizing by addition of benzin, M.P. 142–144° C. The purified product is dissolved in t-butanol (10 ml.) at room temperature and dry ammonia gas is bubbled into the solution for two hours. The reaction mixture is concentrated in vacuo, diluted with water, cooled and the product collected by filtration. There is obtained 0.40 g. (91% of theory) of 5-chloro-2,4-disulfamylaniline, melting point 260–261° C.

The following examples are illustrative of the advantages in yields obtained when ammonolysis is effected in the presence of t-butanol as compared with the yields when effected in the presence of water.

EXAMPLE 8

*Ammonolysis in Water*

Crude dry 5-chloroaniline-2,4-disulfonylchloride, 87.6 g., is prepared by substantially the same procedure described in Example 1, and half of the product is set aside for use in the synthesis described in Example 9. The remaining portion of the product (43.8 g., 0.135 mole) is added gradually with stirring to 400 ml. of 28% aqueous ammonia at 5° C. The mixture is aged twenty minutes at 5° C. then one hour at 25° C. The clear solution obtained is concentrated under reduced pressure to a small volume in order to remove residual ammonia. The concentrated slurry is diluted with water to its original volume and aged at 5° C. for one hour. The solid 5-chloro-2,4-disulfamylaniline obtained on filtration, washing and drying weighs 19.1 g. (49.5%).

EXAMPLE 9

*Ammonolysis in t-Butanol*

The portion of crude, dry 5-chloroaniline-2,4-disulfonyl chloride (43.8 g., 0.135 mole), set aside in the preparation described in Example 8, is added to 220 ml. of t- butanol and gaseous ammonia bubbled into the stirred mixture at 25–30° C. for one hour. In order to remove residual excess ammonia the reaction mixture is concentrated in vacuo almost to dryness, treated with 200 ml. water and concentrated. The product is triturated with 25 ml. water, aged at 5° C. for one hour, filtered, water-washed and dried. The yield of 5-chloro-2,4-disulfamylaniline is 27.6 g. (71.5%).

While the above examples illustrate specific conditions for the chlorosulfonation and ammonolysis steps in preparing certain disulfamylaniline derivatives, it is to be understood that modifications can be made in the reaction conditions without departing from the scope of this invention. Also, other aniline derivatives or an amine salt of the selected aniline derivative having the general structural formula

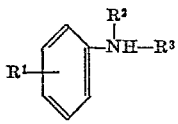

wherein $R^1$ and $R^2$ have the meaning assigned to each of them above; and $R^3$ is hydrogen or a lower alkanoyl radical such as the formyl or acetyl radical, such as m-Bromoaniline,
m-Toluidine,
m-Anisidine,
N-methyl-m-chloroaniline,
m-Fluoroaniline,
m-Nitroaniline and the like can be substituted for the m-chloroaniline employed in Examples 1–4 and chlorosulfonated by any one of the processes there described to form the corresponding disulfonyl chloride, such as 5-bromoaniline-2,4-disulfonyl chloride,
5-methylaniline-2,4-disulfonyl chloride,
5-methoxyaniline-2,4-disulfonyl chloride,
N-methyl-5-chloroaniline-2,4-disulfonyl chloride,
5-fluoroaniline-2,4-disulfonyl chloride,
5-nitroaniline-2,4-disulfonyl chloride, and that the thus obtained disulfonyl chloride can be dissolved in tertiary butanol and treated with ammonia gas by substantially the same process as described in Example 7 to produce the corresponding disulfamyl derivatives, such as 5-bromo-2,4-disulfamylaniline,
5-methyl-2,4-disulfamylaniline,
5-methoxy-2,4-disulfamylaniline,
5-chloro-N-methyl-2,4-disulfamylaniline,
5-fluoro-2,4-disulfamylaniline,
5-nitro-2,4-disulfamylaniline which can be reduced by known methods to 5-amino-2,4-disulfamylaniline.

What is claimed is:
1. A process for preparing an aniline-disulfonyl chloride compound of the formula

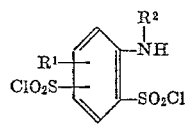

wherein $R^1$ is selected from the group consisting of halogen, lower alkyl, lower alkoxy, nitro and amino; and $R^2$ is selected from the group consisting of hydrogen and lower alkyl, wherein a reaction mixture containing as its only essential reactants chlorosulfonic acid and an aniline compound of the formula

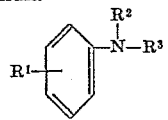

wherein $R^1$ and $R^2$ have the meaning assigned each of them above and $R^3$ is selected from the group consisting of hydrogen and lower alkanoyl is heated within the temperature range of 95–130° C.; then cooling, and then adding a chlorinating agent selected from the group consisting of thionyl chloride, sulfuryl chloride, phosphorus trichloride and phosphorus pentachloride and heating at a temperature just below the boiling point, the reactants being employed in the ratio of at least 5 molar equivalents of chlorosulfonic acid and two molar equivalents of chlorinating agent to each mole of aniline compound.

2. A process as claimed in claim 1, wherein thionyl chloride is employed as the chlorinating agent.

References Cited in the file of this patent
UNITED STATES PATENTS

| | | |
|---|---|---|
| 1,867,088 | Ossenbeck et al. | July 12, 1932 |
| 2,402,611 | Dickey et al. | June 25, 1946 |
| 2,422,359 | Maynard et al. | June 17, 1947 |
| 2,618,655 | Dickey et al. | Nov. 18, 1952 |
| 2,643,244 | Simons | June 23, 1953 |
| 2,730,534 | Hoefle et al. | Jan. 10, 1956 |
| 2,910,488 | Novello | Oct. 27, 1959 |

FOREIGN PATENTS

| | | |
|---|---|---|
| 446,402 | Belgium | Aug. 31, 1942 |
| 752,572 | Germany | Jan. 4, 1954 |
| 689,977 | Great Britain | Apr. 8, 1953 |
| 230,438 | Switzerland | Mar. 16, 1944 |

OTHER REFERENCES

Post et al.: Berichte der Deutsche. Chem. Gesell., vol. 14, pp. 1605–1607 (1881).

Lustig et al.: Monatshefte für Chemie, vol. 48, 87–97 (1927).

Chemical Abstracts, vol. 44, pp. 2468–9 (1950), citing Soladar et al., Zhur Priklad Khim., vol. 22, 508–17 (1947).

Wagner et al.: "Synthetic Organic Chemistry," John Wiley and Sons, New York (1953), pages 821–823.